United States Patent
Nakai et al.

(10) Patent No.: US 6,905,369 B2
(45) Date of Patent: Jun. 14, 2005

(54) CARD CONNECTOR WITH IMPROVED ERRONEOUS CARD INSERTION PREVENTION

(75) Inventors: Yasuo Nakai, Nara (JP); Akihiro Tanaka, Osaka (JP)

(73) Assignee: Hosiden Corporation, Yao (JP)

( * ) Notice: Subject to any disclaimer, the term of this patent is extended or adjusted under 35 U.S.C. 154(b) by 0 days.

(21) Appl. No.: 10/833,064

(22) Filed: Apr. 28, 2004

(65) Prior Publication Data

US 2004/0219810 A1 Nov. 4, 2004

(30) Foreign Application Priority Data

May 1, 2003 (JP) ........................................ 2003-126478

(51) Int. Cl.⁷ ............................................. H01R 24/00
(52) U.S. Cl. ..................... 439/630; 439/633; 439/946
(58) Field of Search ................................ 439/630, 633, 439/946, 153

(56) References Cited

U.S. PATENT DOCUMENTS 6,068,516 A * 5/2000 Chang ........................ 439/633
6,478,630 B1 * 11/2002 Hsu ............................. 439/680
6,840,807 B2 * 1/2005 Ooya et al. ................. 439/630
2002/0102882 A1 * 8/2002 Tanaka ........................ 439/630

FOREIGN PATENT DOCUMENTS

| JP | H10-187896 | 7/1998 |
| JP | 2003-31286 | 1/2003 |
| JP | 2003-59588 | 2/2003 |

* cited by examiner

*Primary Examiner*—Hae Moon Hyeon
(74) *Attorney, Agent, or Firm*—Bacon & Thomas (57) ABSTRACT

A locking projection (6) which is formed into a channel-like shape is enabled to enter a channel-like recess (130) positioned in one side end portion which is outside a region where terminals (120) of a card (100) that is inserted in a normal posture are formed. A locking portion (65) of the locking projection (6) is formed as an inclined face, whereby the locking projection (6) is prevented from being raised, even when the card (100) is pressed against the locking projection. The locking portion (65) is positioned posterior in the card insertion direction to the positions where contacts (4) are placed.

6 Claims, 7 Drawing Sheets

CARD CONNECTOR WITH IMPROVED ERRONEOUS CARD INSERTION PREVENTION

BACKGROUND OF THE INVENTION

1. Field of the Invention

The present invention relates to a card connector, and more particularly to a card connector in which surface terminals of a card that is inserted in a normal posture into a card insertion space of a case are contacted with contacts of the case, and, when a card is inserted in a posture different from the normal posture, such erroneous insertion is blocked.

2. Explanation of Related Art

Conventionally, a technique for preventing erroneous insertion of a card from occurring in an IC card connector is known (see Japanese Patent Application Laying-Open No. 10-187896). In the technique, a metal cover of a case is provided with a stopper piece which is formed by cutting and raising, and, when a card is erroneously inserted in a posture different from the normal posture, the tip end of the stopper piece bumps against the front end face in the insertion direction of the card to block further insertion or movement of the card.

In the conventional technique, when the direction of inserting a card into the case is defined as the forward direction, the stopper piece which is formed by cutting and raising the metal cover elongates in the rearward direction, and the front end face in the insertion direction of the card which is erroneously inserted bumps against the tip end of the thus configured stopper piece, thereby blocking erroneous insertion. When such an IC card connector is miniaturized, the metal cover must be thinned, and hence also the stopper piece which is formed by cutting and raising the metal cover is inevitably thinned. When the front end face in the insertion direction of the card which is erroneously inserted bumps against the tip end of the stopper piece, therefore, the stopper piece may buckle or deform.

To comply with this, a technique has been proposed (see Japanese Patent Application Laying-Open No. 2003-31286 or No. 2003-59588). In the proposed technique, a flat tongue-like locking projection in a cut and raised state is bendingly formed in a cover of a case. The locking projection is engaged with the front end face in the insertion direction of a card which is erroneously inserted in a posture different from a normal posture, thereby blocking further insertion or movement of the card. Moreover, the bend line of a basal portion of the locking projection elongates in the card insertion direction, and the rear end face in the plate surface width direction of the locking projection is formed as a locking portion for the front end face in the insertion direction of a card.

According to the configuration, when the locking portion is engaged with the front end face in the insertion direction of a card which is erroneously inserted, the pushing force applied on the card acts in the plate surface width direction of the locking projection. As compared with the stopper piece disclosed in Japanese Patent Application Laying-Open No. 10-187896, therefore, the locking projection is provided with a larger strength against erroneous card insertion, so that the locking projection is correspondingly prevented from buckling or deforming.

Recently, miniaturization of a card is remarkably advanced, and a cover of a case is thinned in accordance with the miniaturization. Therefore, it is requested to take measures for improving the mechanical structural strength on such a locking projection for blocking insertion or movement of an erroneously inserted card. When a card is to be inserted into a case, conventionally, the card is pushed with one hand. By contrast, a case where a card is pushed with both hands while applying a force which is larger than that applied in the conventional case may occur.

Under such a situation, when measures for preventing erroneous card insertion from occurring are taken by employing the stopper piece disclosed in Japanese Patent Application Laying-Open No. 10-187896, there arises the possibility that the stopper piece buckles or deforms, and moreover an erroneously inserted card enters under the buckling or deforming stopper piece, whereby the card or a connector is damaged or broken.

By contrast, when measures for preventing erroneous card insertion from occurring are taken by employing the locking projection disclosed in Japanese Patent Application Laying-Open Nos. 2003-31286 and 2003-59588, the strength against erroneous card insertion is enhanced as compared with the case of the stopper piece disclosed in Japanese Patent Application Laying-Open No. 10-187896, and hence the locking projection hardly buckles or deforms. When a large pushing force which exceeds a certain level is applied to an erroneously inserted card, however, there is the possibility that the locking projection cannot withstand the pushing force to buckle or deform. In the card connectors of Japanese Patent Application Laying-Open Nos. 2003-31286 and 2003-59588, therefore, the locking projection in a cut and raised state is bendingly formed in plural positions of the cover so that the locking projections are laterally arranged. According to the configuration, however, one or more of the locking projections are inevitably positioned in a region where a terminal formed region of a card which is inserted and moved in a normal posture passes, and hence there is the possibility that, during the process of inserting the card, the locking projections damage terminals of the card or the locking projections and the terminals are short-circuited. In order to prevent such a situation from occurring, in the card connector disclosed in Japanese Patent Application Laying-Open No. 2003-31286, additional measures that the locking projections are covered by an electrically insulative resin are taken.

In the case where erroneous card insertion is prevented from occurring by the locking projections disclosed in Japanese Patent Application Laying-Open Nos. 2003-31286 and 2003-59588, when a large pushing force which exceeds a certain level is applied to an erroneously inserted card, the locking portions of the end faces of the locking projections may slip with respect to the front end face in the insertion direction of the card. When such slippage occurs, there may arise a situation where the locking projections are raised while causing the cover to upward deform, and the card enters under the locking projections. When the card enters under the locking projections, the cover excessively swells and deforms, thereby causing a problem in that the connector may be broken.

SUMMARY OF THE INVENTION

The invention has been conducted in view of such circumstances.

Namely, the invention is based on a concept that a locking projection in a cut and raised state is bendingly formed in a cover, an end face in the plate surface width direction of the locking projection is formed as a locking portion, and the locking portion is engaged with the front end face in the insertion direction of a card which is erroneously inserted, thereby blocking further insertion or movement of the card. It is an object of the invention to provide a card connector in which measures for improving the mechanical structural strength at which deformation hardly occurs is taken on a locking projection having such a function of preventing erroneous insertion, so that, even when an erroneously inserted card is strongly pressed against the locking projection, erroneous insertion of the card can be prevented from occurring by the locking projection disposed outside a region where a terminal formed region of the card passes, without causing the locking projection to buckle or deform.

It is another object of the invention to provide a card connector in which there is no possibility that a locking projection damages terminals of a card which is inserted in a normal posture or short-circuits the terminals of the card.

It is a further object of the invention to provide a card connector in which a locking portion in an end face of a locking projection is formed into a shape in which slip-page with respect to the front end face in the insertion direction of a card is hardly caused, and hence a situation where a card enters under the locking projection never occurs even when a larger pushing force is applied to the card.

It is a still further object of the invention to provide a card connector in which measures for, even when a larger pushing force is applied to a card, preventing a force of raising a locking portion from being generated are taken, and hence a situation where a card enters under the locking projection never occurs even when a larger pushing force is applied to the card.

It is a still further object of the invention to provide a card connector in which there is no possibility that, when a card which has been inserted in a normal posture is ejected, a locking projection damages the card.

It is a still further object of the invention to provide a card connector in which a situation where contacts of a case are damaged or broken by an erroneously inserted card does not occur.

According to the invention, in order to attain the objects, the card connector is configured in the following manner.

The card connector includes a case 1 and a locking projection 6.

The case 1 forms a card insertion space into and from which a card 100 is to be inserted and extracted, comprises contacts 4 which are to be elastically contacted with terminals 120 of the card 100 that is inserted in a normal posture into the card insertion space, and is splittable into a base 2 and a cover 3 which is attached to the base 2, and which is formed by a sheet metal.

The locking projection 6 is to be engaged with a front end face in an insertion direction of the card 100 which is erroneously inserted in a posture different from the normal posture, thereby blocking further insertion or movement of the card 100, and bendingly formed in a cut and raised state in the cover 3 to project into the card insertion space. A bend line 61 of a basal portion of the locking projection 6 elongates in the card insertion direction. A rear end face in a plate surface width direction of the locking projection 6 is formed as a locking portion 65 for a front end face in the insertion direction of the card 100. The locking projection 6 has a projection width which enables the locking projection to enter a channel-like recess 130 in which a tip end is opened, the recess being formed in a face of the card 100 opposed to the cover 3, and in one side end portion which is outside a region where the terminals 120 of the card 100 are formed, the card being inserted in the normal posture into the card insertion space. The locking projection comprises: a first plate portion 62 which elongates into the card insertion space with starting from the bend line 61 of the basal portion of the locking projection 6; and a second plate portion 63 which is bendingly continuous to the first plate portion 62 in the card insertion space. The first plate portion 62 and the second plate portion 63 extend in the card insertion direction.

The invention has the following effects and advantages.

According to the configuration, the projection width of the locking projection is defined as described above, and hence the locking projection enters the channel-like recess of the card when the card is inserted in the normal posture. Therefore, the card can be freely inserted without being hindered by the locking projection, to a position where the terminals of the card are elastically contacted with the contacts of the case. Since the locking projection enters the channel-like recess formed in one side end portion which is outside the region where the terminals of the card inserted in the normal posture are formed, the locking projection is not positioned in a region where the terminal formed region of a card which is inserted in the normal posture passes. Therefore, there is no possibility that, during the process of inserting a card, the locking projection damages terminals of the card or the locking projections and the terminals are electrically short-circuited.

By contrast, when a card is inserted erroneously or in an inverted posture or a longitudinally reversed posture, the locking portion of the locking projection is engaged with the front end face in the insertion direction of the card, to block further insertion or movement of the card. Therefore, the card is not erroneously inserted. The locking projection comprises the first plate portion which extends into the card insertion space, and the second plate portion which is bendingly continuous to the first plate portion in the card insertion space, and the first and second plate portions extend in the card insertion direction. As compared with the flat tongue-like locking projection which has been described in the beginning of the description, and which is disclosed in Japanese Patent Application Laying-Open Nos. 2003-31286 and 2003-59588, therefore, the locking projection exerts larger flexural rigidity. As a result, even when a card is strongly pressed against the locking projection, the possibility that the locking projection buckles or deforms is reduced.

In the invention, preferably, the first plate portion and the second plate portion are formed into a channel-like shape which elongates in the card insertion direction. According to the configuration, although the locking projection has a simple shape or a channel-like shape, the locking projection is provided with large flexural rigidity. Even when an erroneously inserted card is strongly pressed against the locking projection, therefore, the possibility that the locking projection buckles or deforms is further reduced. When the locking projection has a channel-like shape, moreover, the contact area in the engagement with the front end face in the insertion direction of an erroneously inserted card is larger than that in the flat tongue-like locking projection which has been described in the beginning of the description, and which is disclosed in Japanese Patent Application Laying-Open Nos. 2003-31286 and 2003-59588. Therefore, the coefficient of friction is correspondingly increased. As a result, a situation where the front end face in the insertion direction of the card slips with respect to the locking portion of the locking projection and the card enters under the locking projection hardly occurs. The channel-like shape of the locking projection includes curved shapes such as a rounded U-shape, an angular U-shape, a V-shape, a mountain-like shape, and a wave shape.

In the invention, preferably, the locking portion of the locking projection is formed as an inclined face in which a place positioned nearer to the bend line is closer to a front side in the card insertion direction. According to the configuration, when an erroneously inserted card is strongly pressed against the locking projection, a force of raising the locking portion is not generated, and that of downward pressing the locking portion is sometimes generated. Even when a large pushing force is applied to a card, therefore, a situation where the card enters under the locking projection never occurs.

In the invention, preferably, an inclined face in which a place positioned nearer to a front side in the card insertion direction is closer to the first plate portion is formed in at least a front end portion of an outer side face of the second plate portion of the locking projection which is formed into a channel-like shape by the first plate portion and the second plate portion, whereby a front end in a plate surface width direction of the second plate portion is prevented from being contacted with a wall face of the recess of the card. According to the configuration, when a card which has been inserted in a normal posture is ejected, a situation where the locking projection is caught by a wall face of the channel-like recess of the card to damage the card does not occur.

In the invention, preferably, the locking portion of the locking projection is positioned posterior in the card insertion direction to positions where the contacts are placed. According to the configuration, before the front end face in the insertion direction of the card which is erroneously inserted bumps against the contacts, the locking portion of the locking projection is engaged with the front end face in the insertion direction of the card, to block further insertion or movement of the card. Therefore, a situation where the contacts are damaged or broken by an erroneously inserted card does not occur.

According to the invention, it is possible to employ a configuration in which each of the contacts is formed by a spring contact piece which rearward elongates in a front end portion of the case, and comprises a contact point in a tip end of the spring contact piece, the contact point being to override corresponding one of the surface terminals of the card to be elastically contacted with the terminal.

DESCRIPTION OF THE PREFERRED EMBODIMENTS

Figure 1:
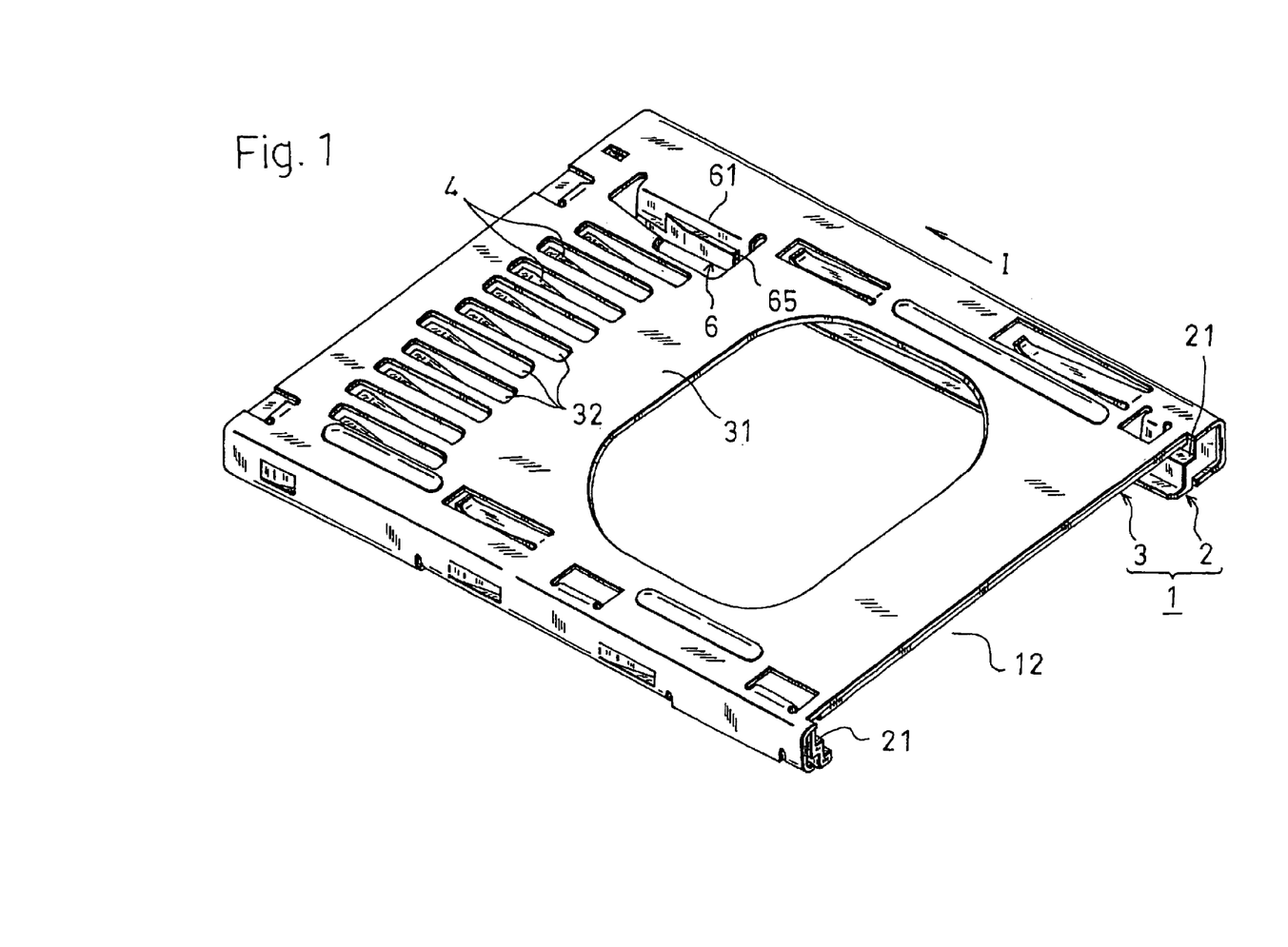
FIG. 1 is a schematic perspective view of a card connector of an embodiment of the invention.
Figure 2:
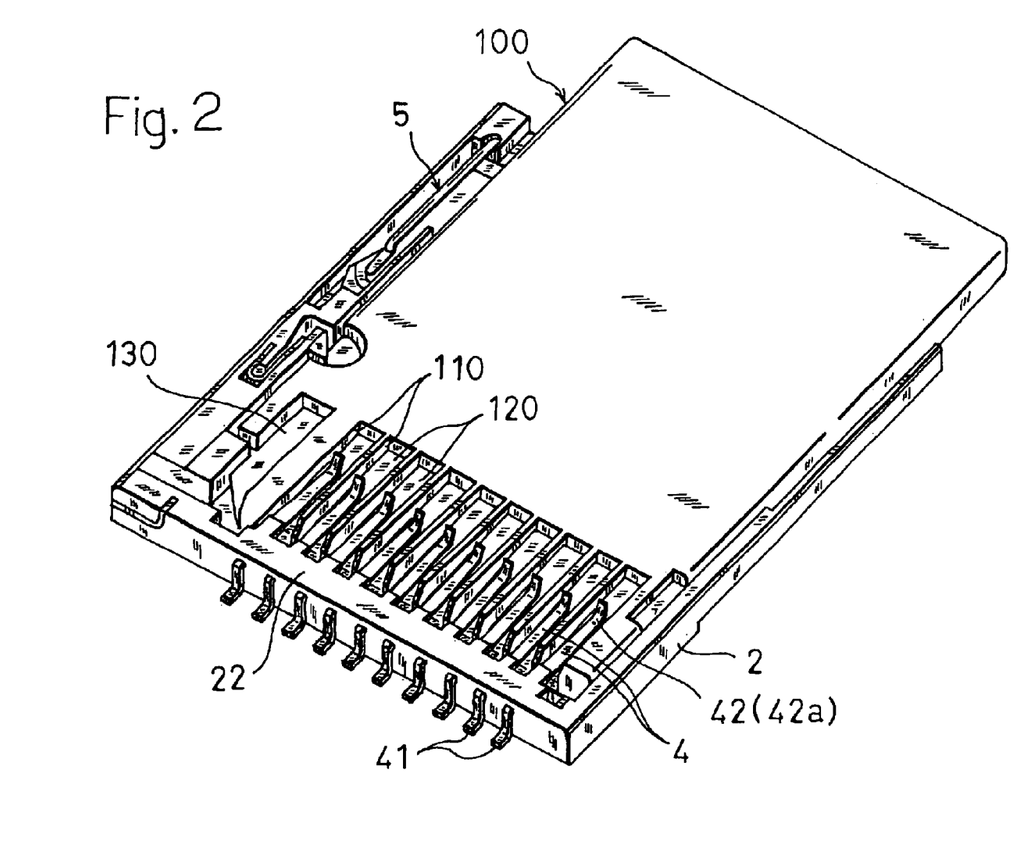
FIG. 2 is a schematic perspective view of a state where a card in a normal posture is inserted into the card connector in which a cover is not shown.
Figure 3:
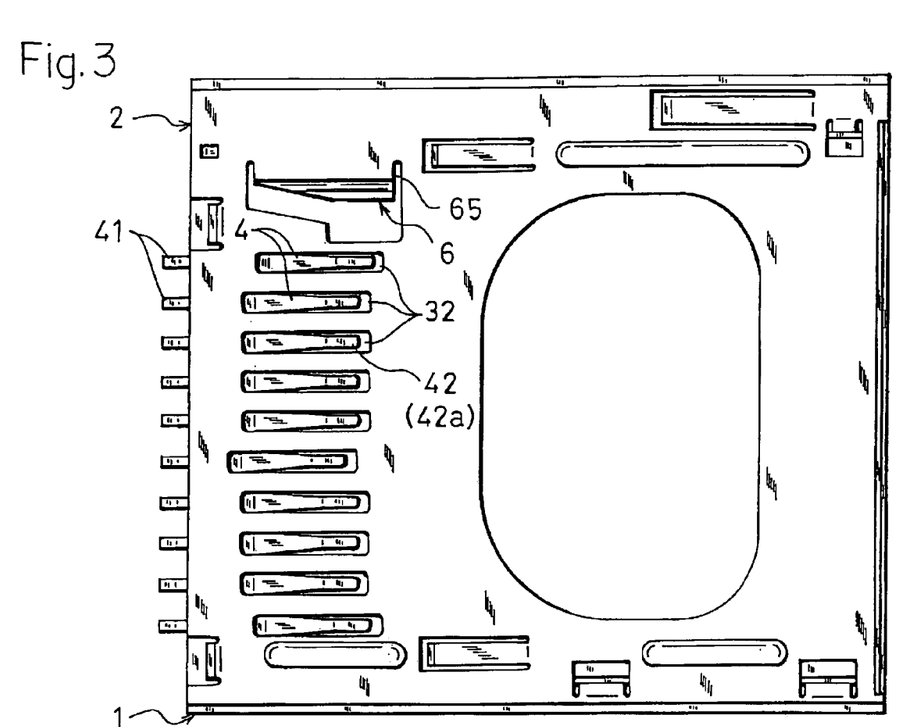
FIG. 3 is a schematic plan view of the card connector.
Figure 4A:
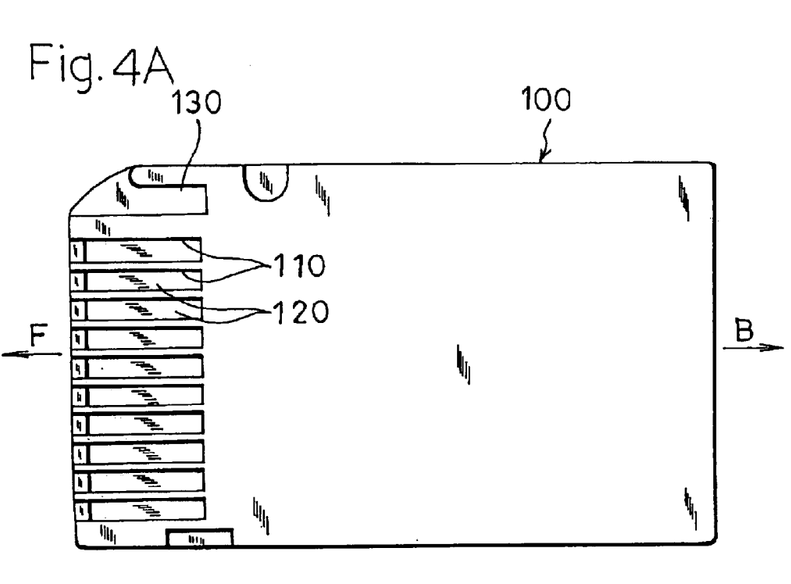
FIG. 4A is a plan view of the card.
Figure 4B:
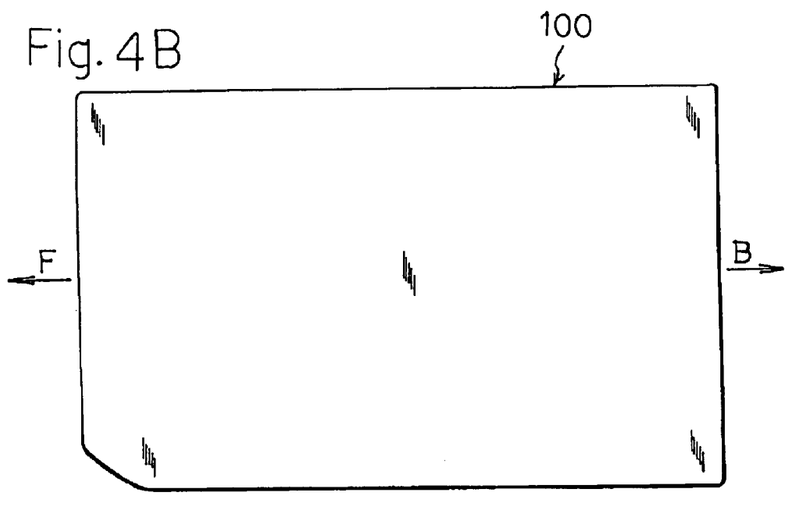
FIG. 4B is a rear view of the card.
Figure 5A:
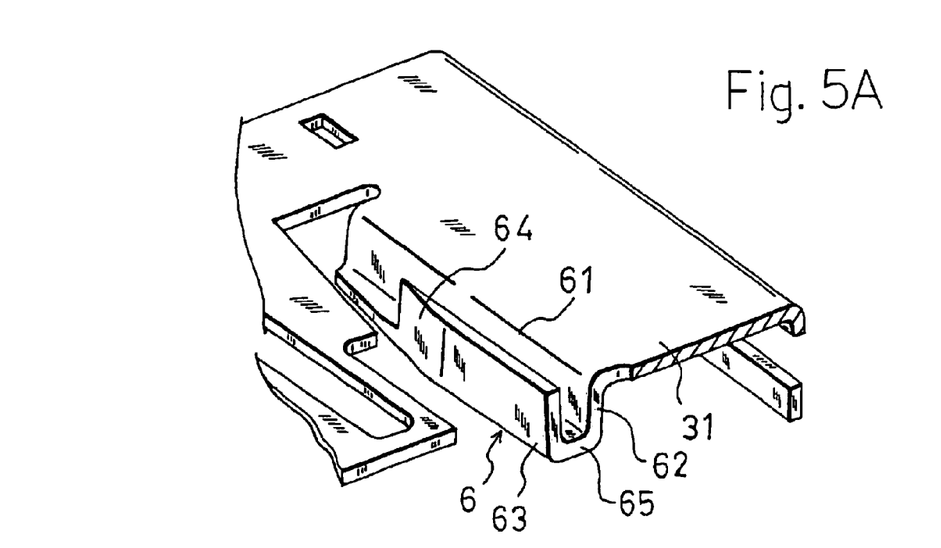
FIG. 5A is an enlarged perspective view of main portions of FIG. 1.
Figure 5B:
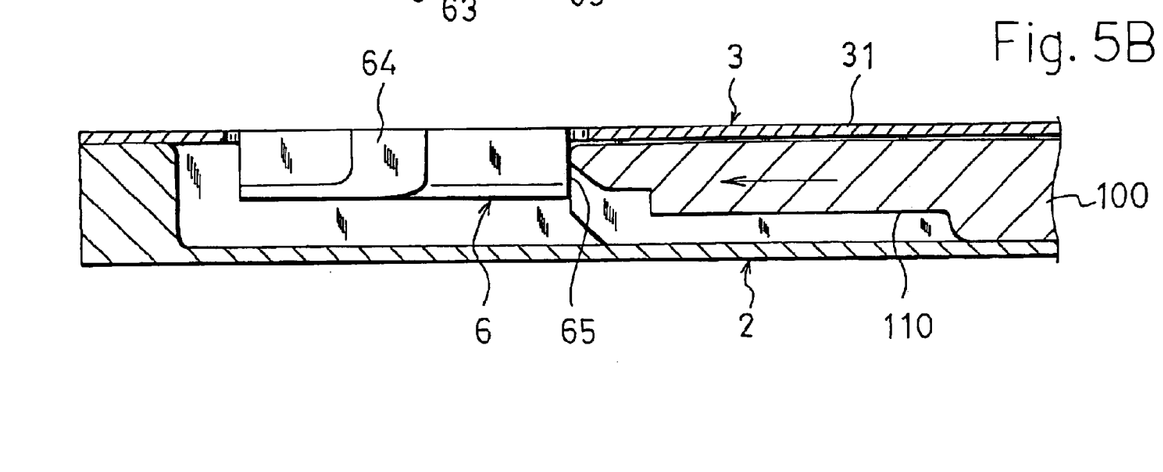
FIG. 5B is a section view illustrating the function of a locking projection in FIG. 5A.
Figure 6A:
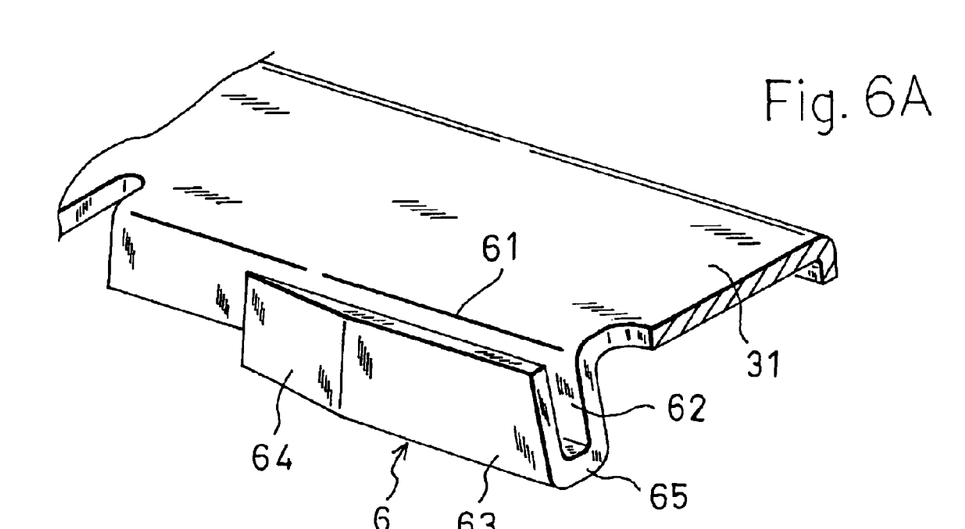
FIG. 6A is an enlarged perspective view showing a locking projection in a modification.
Figure 6B:
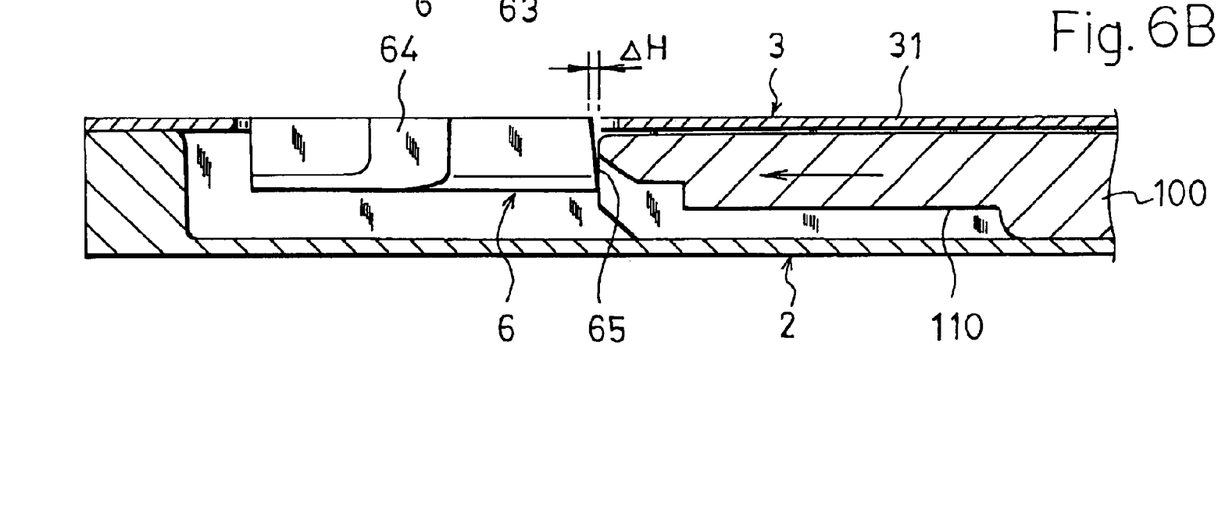
FIG. 6B is a section view illustrating the function of the locking projection 6 in FIG. 6A.
Figure 7:
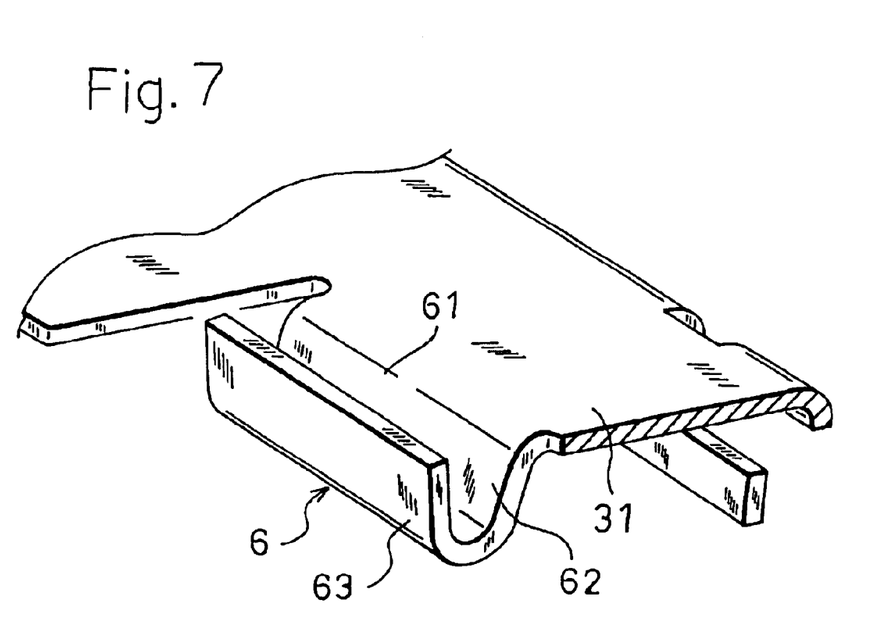
FIG. 7 is a perspective view showing another modification of the locking projection.

FIG. 1 is a schematic perspective view of a card connector of an embodiment of the invention, FIG. 2 is a schematic perspective view of a state where a card 100 in a normal posture is inserted into the card connector in which a cover 3 is omitted, FIG. 3 is a schematic plan view of the card connector, FIG. 4A is a plan view of the card 100, FIG. 4B is a rear view of the card 100, FIG. 5A is an enlarged perspective view of main portions of FIG. 1, FIG. 5B is a section view illustrating the function of a locking projection 6, FIG. 6A is an enlarged perspective view showing a locking projection in a modification, FIG. 6B is a section view illustrating the function of the locking projection 6 in FIG. 6A, and FIG. 7 is a perspective view showing another modification of the locking projection.

The card connector of FIG. 1 comprises a flat case 1 which is splittable into: a base 2 that is formed by a molded piece of a synthetic resin; and a cover 3 which is formed by a sheet metal. The cover 3 is attached to the base 2. The internal space of the case 1 is used as a card insertion space. A card insertion port 12 is formed in a rear end portion of the case 1. The base 2 comprises guide grooves 21 which guide lateral ends of a card, respectively, and a head portion 22 in which, as shown in FIG. 2, a plurality of contacts 4 are attached in a laterally arranged manner to a front end portion of the base. Soldering terminals 41 which are continuous respectively to the contacts 4 are projected in a laterally arranged manner from the front side of the head portion 22. Each of the contacts 4 is formed by a spring contact piece which rearward elongates from the head portion 22 to be positioned in the card insertion space. An arcuate curved portion 42 which is formed in the tip end of the spring contact piece is used as a contact point 42a. An ejecting mechanism 5 is disposed in one side of the width direction of the base 2. The ejecting mechanism 5 has functions such as a locking function of positioning the card 100 which is inserted in the normal posture into the card insertion space, to a set position, and a function of canceling the positioned state where the card 100 is positioned at the set position, and rearward discharging the card with using a spring pressure.

As shown in FIG. 1, the cover 3 which is formed by a sheet metal has a face plate portion 31 which covers the opened upper face of the base 2. A locking projection 6 is disposed in a front end portion of the face plate portion 31. The locking projection 6 is formed by cutting and raising a predetermined place (described later) of the face plate portion 31 of a thin metal sheet forming the cover 3. A bend line 61 of the basal portion of the locking projection 6 elongates in parallel or substantially parallel to the anteroposterior direction, or the card insertion direction (the arrow I).

FIGS. 5A, 6A, and 7 show several shapes of the locking projection 6. The locking projection 6 of FIG. 5A is formed into a substantially U-shaped channel which elongates in the card insertion direction I or the anteroposterior direction. The locking projection 6 comprises: a first plate portion 62 which elongates into the card insertion space with starting from the bend line 61; and an L-shaped second plate portion 63 which is bendingly continuous to the first plate portion 62. The first and second plate portions 62, 63 extend in the card insertion direction, and their width directions coincide with the anteroposterior direction. An inclined face 64 in which a place positioned at a more forward position in the card insertion direction I is closer to the first plate portion 62 is formed in a front end portion of an outer side face of the second plate portion 63. In the locking projection 6, the rear end face, i.e., the rear end faces in the plate surface width direction (in the illustrated example, the anteroposterior direction) of the first plate portion 62 and the second plate portion 63 are formed as a substantially U-shaped locking portion 65 which maintains a vertical posture in the card insertion space. In the locking projection 6 of the illustrated example, moreover, the locking portion 65 is positioned posterior in the card insertion direction to all the positions where the contacts 4 are placed.

The locking projection 6 of FIG. 6A is different from the locking projection 6 of FIG. 5A in that the substantially U-shaped locking portion 65 is formed as an inclined face in which a place positioned nearer to the bend line 61 is closer to the front side in the card insertion direction, but is substantially identical with the locking projection 6 of FIG. 5A in the other configuration. Therefore, the identical or corresponding portions are denoted by the same reference numerals. In the locking portion 65 of FIG. 6A formed by an inclined face, the horizontal distance ΔH between the lowest and highest positions can be set to about 0.1 mm. In the locking portion 65 formed by an inclined face, when the card connector is thinned, the inclination with respect to a vertical plane can have a very small value.

The locking projection 6 of FIG. 7 is different from the locking projection 6 of FIG. 5A in that the locking projection is formed into a substantially V-shaped channel shape which elongates in the card insertion direction I or the anteroposterior direction, and also in that the inclined face 64 is not formed, but is substantially identical with the locking projection 6 of FIG. 5A in the other configuration. Therefore, the identical or corresponding portions are denoted by the same reference numerals. In the locking projection 6 also, in the same manner as the locking projection 6 of FIG. 6A, the locking portion 65 can be formed as an inclined face in which a place positioned nearer to the bend line 61 is closer to the front side in the card insertion direction.

In each of the locking projections 6 which have been described with reference to FIGS. 5A and 6A, the inclined face 64 is formed by changing the thickness of the second plate portion 63. Alternatively, the inclined face may be formed by folding or arcuately bending the front end of a rising portion of the second plate portion 63.

As shown in FIG. 1, long hole-like windows 32 are opened in a laterally arranged state in a front end portion of the face plate portion 31 of the cover 3, and positioned in places respectively corresponding to the contacts 4 disposed on the base 2. The locking projection 6 is positioned on one side of the window row consisting of the arrangement of the windows 32. Therefore, the locking projection 6 is formed in a place which is close to one side of the width direction of the card insertion space.

Next, the card 100 will be described with reference to FIGS. 2, 4A, and 4B. For example, the card 100 is an IC card. The card 100 of the illustrated example is formed into a rectangular shape in a plan view. A longitudinally elongated recess 110 is formed in each of places which are laterally arranged at regular intervals in a front end portion of the surface of the card. Surface terminals 120 are exposed from bottom faces of the recesses 110, respectively. A channel-like recess 130 in which the tip end is opened in the front end of the card 100 is formed on one side of the recess row consisting of the arrangement of the recesses 110. Therefore, the channel-like recess 130 is formed in a place which is close to one end portion in the width direction of the card 100.

The lateral width of the locking projection 6 is shorter than that of the channel-like recess 130. In the locking projection 6, the width of projection from the face plate portion 31 is determined so that, when, as indicated by the arrow F in FIG. 4A, the card 100 is inserted into the card insertion space while the surface of the card 100 is upward directed and the front end of the card 100 is forward directed, or when the card 100 is inserted in the normal posture into the card insertion space of the case 1, the locking projection 6 can easily enter the channel-like recess 130. When the card 100 is inserted in the normal posture into the card insertion space, the card 100 is inserted to the set position as shown in FIG. 2 without being hindered by the locking projection 6, and the contacts 4 override the surface terminals 120 of the card 100 which is inserted to the set position, so that the contact points 42a are elastically contacted with the surface terminals 120, respectively.

By contrast, when, as indicated by the arrow B in FIG. 4A, the card 100 is inserted into the card insertion space while the surface of the card 100 is upward directed and the rear end of the card 100 is forward directed (hereinafter, this insertion is referred to as "surface-up and rearward insertion"), the locking portion 65 of the locking projection 6 is positioned posterior in the card insertion direction to all the positions where the contacts 4 are placed, and the channel-like recess 130 of the card 100 is not opposed to the place where the locking projection 6 is positioned. Therefore, the locking portion 65 of the locking projection 6 is engaged with the rear end (the front end face in the insertion direction) of the card 100 in advance that the card 100 which is inserted into the card insertion space bumps against the contacts 4, whereby further insertion or movement of the card 100 is blocked.

When, as indicated by the arrow F in FIG. 4B, the card 100 is inserted into the card insertion space while the backface of the card 100 is upward directed and the front end of the card 100 is forward directed (hereinafter, this insertion is referred to as "backface-up and forward insertion"), the locking portion 65 of the locking projection 6 is positioned posterior in the card insertion direction to all the positions where the contacts 4 are placed, and the channel-like recess 130 of the card 100 is not opposed to the place where the locking projection 6 is positioned. Therefore, the locking portion 65 of the locking projection 6 is engaged with the front end (the front end face in the insertion direction) of the card 100 in advance that the card 100 which is inserted into the card insertion space bumps against the contacts 4, whereby further insertion or movement of the card 100 is blocked.

When, as indicated by the arrow B in FIG. 4B, the card 100 is inserted into the card insertion space while the backface of the card 100 is upward directed and the rear end of the card 100 is forward directed (hereinafter, this insertion is referred to as "backface-up and rearward insertion"), the locking portion 65 of the locking projection 6 is positioned posterior in the card insertion direction to all the positions where the contacts 4 are placed, and the channel-like recess 130 of the card 100 is not opposed to the place where the locking projection 6 is positioned. Therefore, the locking portion 65 of the locking projection 6 is engaged with the rear end (the front end face in the insertion direction) of the card 100 in advance that the card 100 which is inserted into the card insertion space bumps against the contacts 4, whereby further insertion or movement of the card 100 is blocked.

As seen from the above, when the card 100 is inserted into the card insertion space in a posture different from the normal posture, specifically, when one of the surface-up and rearward insertion, the backface-up and forward insertion, and the backface-up and rearward insertion is conducted, the locking portion 65 of the locking projection 6 is engaged with the card 100 to block further insertion or movement of the card 100, in advance that the card 100 interferes with the contacts 4. Therefore, a situation where the erroneously inserted card 100 interferes with the contacts 4 and the contacts 4 are damaged or broken never occurs.

When the card 100 is inserted in the normal posture into the card insertion space, the locking projection 6 easily enters the channel-like recess 130 of the card 100, and no terminal exists in the channel-like recess 130. Consequently, there is no possibility of an accident in which the locking projection 6 damages or short-circuits the surface terminals 120 of the card 100. Therefore, it is not required to cover the locking projection 6 with an electrically insulative layer such as a resin layer to prevent a short-circuit or the like from occurring. Moreover, the inclined face 64 is formed in the locking projection 6 which enters the channel-like recess 130 of the card 100 at the set position when the card 100 is ejected from the set position by the function of the ejecting mechanism 5, therefore, a situation where the front end of the locking projection 6 shaves off the inner face of the channel-like recess 130 to damage the inner face does not occur.

In the embodiment, the locking projection 6 for blocking insertion or movement of the erroneously inserted card 100 is formed by the first plate portion 62 and the second plate portion 63 into a channel-like shape which elongates in the card insertion direction I (see FIG. 1). Even when miniaturization and thinning of the card connector are remarkably realized by producing the cover 3 of the case 1 with a thin sheet metal, therefore, the effect that the mechanical structural strength is improved is exerted. Specifically, when the front end face in the insertion direction of the erroneously inserted card 100 is pressed against the locking portion 65 of the locking projection 6 by a large force, the pressing force acts in the longitudinal direction of the locking projection 6 of a channel-like shape having large flexural rigidity as shown in FIG. 5B or 6B. Therefore, the function of blocking insertion or movement of the card 100 without causing the locking projection 6 to buckle or deform is exerted to surely prevent erroneous insertion from occurring. This function is similarly exerted also when the locking projection 6 is formed into a substantially V-shaped channel shape as shown in FIG. 7.

Since the locking projection 6 has a channel-like shape, moreover, the contact area in the engagement with the front end face in the insertion direction of the erroneously inserted card 100 is larger than that in the flat tongue-like locking projection which has been described in the beginning of the description, and which is disclosed in Japanese Patent Application Laying-Open Nos. 2003-31286 and 2003-59588. Therefore, the coefficient of friction is correspondingly increased. As a result, a situation where the front end face in the insertion direction of the card 100 slips with respect to the locking portion 65 of the locking projection 6 and the card enters under the locking projection 6 hardly occurs. In the configuration where the locking portion 65 maintains the vertical posture in the card insertion space as described with reference to FIG. 5A, particularly, the end face forming the locking portion 65 is perpendicular or substantially perpendicular to the card insertion direction. When the front end face in the insertion direction of the card 100 is pressed against the locking portion 65 of the locking projection 6, therefore, a force of raising the locking portion 6 while upward deforming the face plate portion 31 of the cover 3 is hardly generated. As a result, a situation where the card enters under the locking projection 6 hardly occurs. As explained about FIG. 6A, in the configuration where the locking portion 65 of the locking projection 6 is formed as an inclined face in which a place positioned nearer to the bend line 61 is closer to the front side in the card insertion direction, when the erroneously inserted card 100 is strongly pressed against the locking portion 65 of the locking projection 6, a force of raising the locking portion 65 while upward deforming the face plate portion 31 of the cover 3 is never generated, and that of downward pressing the locking portion 65 is sometimes generated. Consequently, the card connector exerts an excellent function that, even when the card 100 is strongly pressed, a situation where the card 100 enters under the locking projection 6 never occurs.

What is claimed is:

1. A card connector wherein said card connector includes a case and a plate-like locking projection, said case forms a card insertion space into and from which a card is to be inserted and extracted, comprises contacts which are to be elastically contacted with terminals of the card that is inserted in a normal posture into said card insertion space, and is splittable into a base and a cover which is attached to the base, and which is formed by a sheet metal, said locking projection is to be engaged with a front end face in an insertion direction of the card which is erroneously inserted in a posture different from the normal posture, thereby blocking further insertion or movement of the card, and bendingly formed in a cut and raised state in said cover to project into the card insertion space, a bend line of a basal portion of said locking projection elongates in the card insertion direction, a rear end face in a plate surface width direction of said locking projection is formed as a locking portion for a front end face in the insertion direction of the card, said locking projection has a projection width which enables said locking projection to enter a channel-like recess in which a tip end is opened, said recess being formed in a face of the card opposed to said cover, and in one side end portion which is outside a region where the terminals of the card are formed, the card being inserted in the normal posture into said card insertion space, said locking projection comprises: a first plate portion which elongates into said card insertion space with starting from said bend line of said basal portion of said locking projection; and a second plate portion which is bendingly continuous to said first plate portion in said card insertion space, and said first plate portion and said second plate portion extend in the card insertion direction.

2. The card connector according to claim 1, wherein said first plate portion and said second plate portion are formed into a channel-like shape which elongates in the card insertion direction.

3. The card connector according to claim 1, wherein said locking portion of said locking projection is formed as an inclined face in which a place positioned nearer to said bend line is closer to a front side in the card insertion direction.

4. The card connector according to claim 1, wherein an inclined face in which a place positioned nearer to a front side in the card insertion direction is closer to said first plate portion is formed in at least a front end portion of an outer side face of said second plate portion of said locking projection which is formed into a channel-like shape by said first plate portion and said second plate portion, whereby a front end in a plate surface width direction of said second plate portion is prevented from being contacted with a wall face of the recess of the card.

5. The card connector according to claim 1, wherein said locking portion of said locking projection is positioned posterior in the card insertion direction to positions where said contacts are placed.

6. The card connector according to claim 1, wherein each of said contacts is formed by a spring contact piece which rearward elongates in a front end portion of said case, and comprises a contact point in a tip end of said spring contact piece, said contact point being to override corresponding one of the surface terminals of the card to be elastically contacted with the terminal.

* * * * *